Feb. 16, 1926.
W. W. SANDERS
1,572,964
SHUT-OFF DISCHARGE VALVE
Filed August 12, 1924
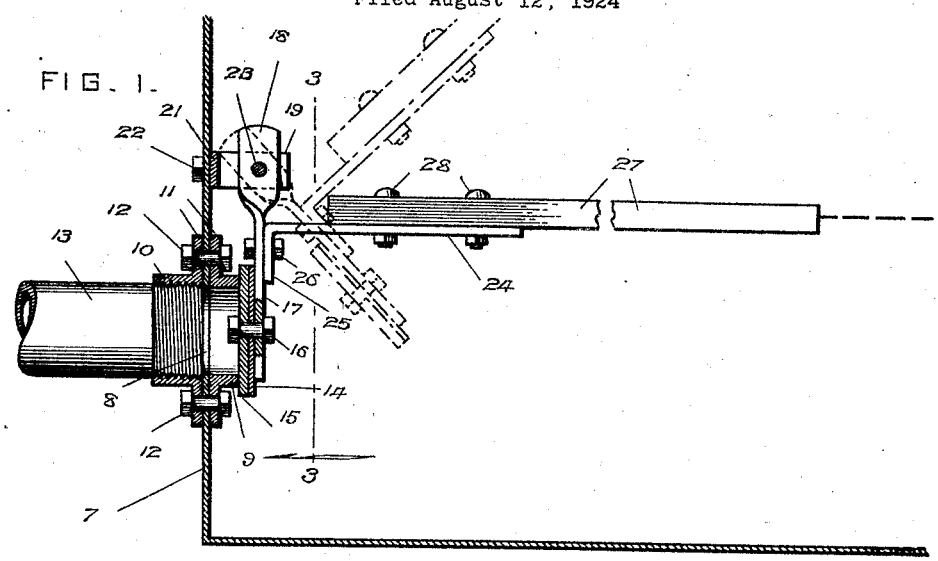
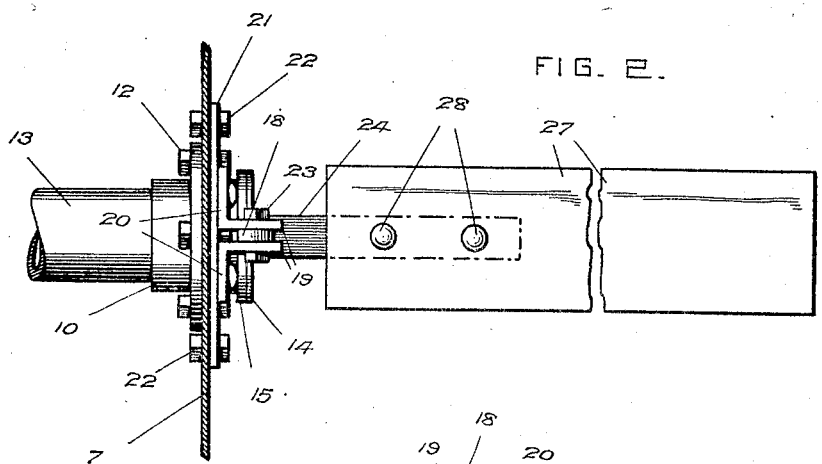
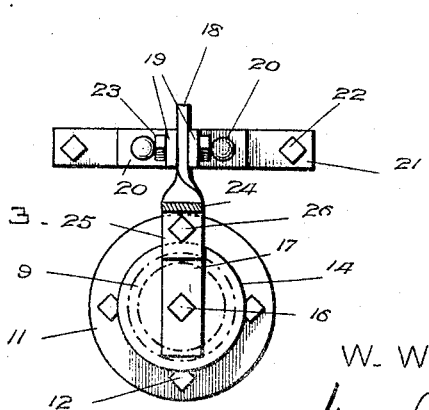
Inventor:
W. W. SANDERS,
By Monroe C. Miller
Attorney Patented Feb. 16, 1926.

1,572,964

UNITED STATES PATENT OFFICE.

WILLIAM WALTER SANDERS, OF GRIFFIN, ARKANSAS.

SHUT-OFF DISCHARGE VALVE.

Application filed August 12, 1924. Serial No. 731,621.

*To all whom it may concern:*

Be it known that I, WILLIAM W. SANDERS, a citizen of the United States, residing at Griffin, in the county of Union and State of Arkansas, have invented certain new and useful Improvements in Shut-Off Discharge Valves, of which the following is a specification, reference being had therein to the accompanying drawing.

The present invention relates to shut-off discharge valves for tanks and other containers, and aims to provide a novel and improved valve device for automatically shutting off the discharge of liquid from a tank or container when the liquid level lowers to a predetermined point.

The present device is intended particularly for use in oil stock tanks from which the oil is pumped to a central station, in order to stop the pumping of oil from any tank of the system when the oil in such tank reaches a predetermined low level, thereby preventing air from being drawn into the pipes leading to the pump, which if it occurs, as under conditions heretofore existing, will result in the pump racing or failing to pump the oil from the several tanks until the air has been bled out and the source of air inlet closed. The provision of one of the improved valves for the outlet of each tank of the supply and pumping system will therefore guard against the flow of air into the pipes leading from the tanks to the pump, inasmuch as the outlet of each tank is automatically closed when the oil reaches a predetermined low level in the tank above the outlet.

Another object of the invention is the provision of a novel and improved float controlled valve.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a vertical section of the present valve, portions being shown in elevation, and the valve being shown closed in full lines and open in dotted lines.

Fig. 2 is a plan view of the construction.

Fig. 3 is a section on the line 3—3 of Fig. 1.

The valve can be used for any tank or container 7 for closing the outlet 8 thereof. As shown, the outlet 8 is in one side wall of the tank near the bottom, and inner and outer collars 9 and 10, respectively, have flanges 11 secured to the wall of the tank 7, by bolts 12 or other securing elements, around the outlet 8. The outer collar 10 is used for the attachment of the discharge pipe 13 through which the liquid flows from the tank.

The valve member is seatable across the collar 9, which provides a seat, and said valve member comprises the metal disk 14 and a gasket or disk 15 of rubber, fibre or other suitable material disposed across the face of the disk 14. Said disk 14 and gasket 15 are of slightly larger diameter than the seat 9 and the gasket is adapted to bear snugly against the seat to close the outlet. The disk and gasket are secured by a bolt 16 or other securing element against a hanger or depending arm 17 constituting a bar of metal, said bolt extending centrally through the disk and gasket and clamping the disk against the arm 17 as well as holding the gasket against the disk.

The arm 17 is suspended for swinging movement to permit the valve member to swing away from and toward the seat 9. Thus, the upper terminal 18 of the arm 17 is twisted into a plane at right angles with the planes of the disk 14 and lower portion of the arm 17, and said terminal 18 is disposed between a pair of ears 19 which, as shown, are the adjacent terminals of angle pieces 20 riveted or otherwise secured to a horizontal bar 21 that is secured, by bolts 22 or otherwise, to the inner surface of the wall of the tank above the outlet 8. The terminal 18 is pivoted to its support by a pivot bolt or member 23 extending through the ears 19 and terminal 18.

A bar or arm 24 arranged at right angles with the arm or bar 17 has an angularly extending terminal 25 bearing against the arm 17 and secured thereto by the bolt 26 or other securing means. Said arm 24 projects from the arm 17 between the pivot 23 and valve member, and said arms 17 and 24 constitute a lever carrying the valve member and float. The float 27 comprises a bar of wood which has one terminal overlapping and secured on the arm 24 by means of bolts 28 or otherwise, and said float 27 can be of any suitable length.

When the tank or container is filled, the float 27, owing to its buoyancy, will swing upwardly, as shown in dotted lines in Fig. 1, thereby swinging the arm 17 and valve member away from the collar or seat 9, so that the liquid can flow through the outlet 8. When the liquid reaches a predetermined low level slightly above the outlet 8 the float 27 having moved downwardly will assume a substantial horizontal position at the liquid level, thereby swinging the valve member against its seat, and preventing further discharge of the liquid from the tank. In this way, the device prevents the liquid level from reaching the outlet, so that air cannot enter the discharge pipe 13. The valve member is held seated by the weight of the float, the pressure of the remaining liquid in the tank against the valve member, and the suction of the pump, thereby preventing leakage past the valve member when it is seated. The device is intended especially for use in each of a number of oil stock tanks from which the oil is pumped to a central collecting station. It is the practice to connect the stock tanks of such a system by pipes with a central pumping station which is usually centrally located and as near as possible to or at a lower level than the stock tanks so that oil from the tanks will gravitate to the pumping station. The pumps also pull oil from the field line as well as from the stock tanks. The stock tanks are filled by producers and the pumping station is operated by a purchaser who obtains the oil from the stock tanks. The purchaser sends out men, known as gaugers, usually each morning, and such gaugers buy the oil in the stock tanks from the producers or sellers. The gaugers open the control valves (not shown) of the tanks, there being a usual control valve in the pipe 13 of each tank 7. The producer or selling party not being responsible for the pumping of the oil will frequently neglect or overlook closing the control valve, so that air will enter the pipe 13 so as to reach the pump, which will impair or stop the pumping of oil from other tanks. By using one of the present automatic valves in each tank, in addition to the usual control valve (not shown) such difficulty is eliminated. Thus, when the purchaser buys the oil in a stock tank, the control valve is opened, and the automatic valve is already open because the float 27 is raised when the tank is filled. Therefore, the gauger simply opens the control valve so that the oil will be pumped from the tank, and no further attention need be given the control and automatic valves, inasmuch as the automatic valve will close the outlet before the oil level reaches the outlet. It is then up to the producer or seller to close the control valve before the tank is again filled. If the producer or operator has two or more stock tanks each equipped with one of the automatic valves in addition to the usual control valve, then an empty tank can be filled during one day while another tank is being pumped out. In other words, the tanks can be alternated, thereby simply requiring the gauger or purchaser to open the control valve of a filled tank and close the control valve of the empty tank during each trip, without requiring return trips especially for closing the control valves of the tanks as they are emptied, inasmuch as the automatic valves are self operating and close the outlets before air can reach the discharge pipes. This saves time on the part of the gauger or purchaser and also provides for maximum capacity of the pumping system.

Having thus described the invention, what is claimed as new is:—

The combination with a tank having an outlet, of an arm pivoted within the tank above said outlet and extending downwardly, a second arm carried by the aforesaid arm and projecting in a direction away from said outlet, a float comprising a bar overlapping and secured to said second arm to swing to a horizontal position above the horizontal plane of said outlet and adapted to swing upwardly, and a valve member carried by the first named arm and seatable across said outlet when said float moves downwardly to a horizontal position and movable away from the outlet when said float swings upwardly from horizontal position.

In testimony whereof I hereunto affix my signature.

WILLIAM WALTER SANDERS.